US007373487B2

(12) United States Patent
Kato et al.

(10) Patent No.: US 7,373,487 B2
(45) Date of Patent: May 13, 2008

(54) CONTROLLER WITH FAIL-SAFE FUNCTION

(75) Inventors: Hironori Kato, Miyagi-ken (JP); Yoshio Sanpei, Tokyo (JP)

(73) Assignee: Alps Electric Co., Ltd, Tokyo (JP)

( * ) Notice: Subject to any disclaimer, the term of this patent is extended or adjusted under 35 U.S.C. 154(b) by 1101 days.

(21) Appl. No.: 10/408,749

(22) Filed: Apr. 7, 2003
(Under 37 CFR 1.47)

(65) Prior Publication Data

US 2004/0064519 A1 Apr. 1, 2004

(30) Foreign Application Priority Data

Apr. 10, 2002 (JP) ............................. 2002-108093

(51) Int. Cl.
*G06F 11/00* (2006.01)
(52) U.S. Cl. .................................................. 712/220
(58) Field of Classification Search ................ 712/220; 709/208; 714/23, 55
See application file for complete search history.

(56) References Cited

U.S. PATENT DOCUMENTS

| 4,412,280 A | 10/1983 | Murphy et al. | ............... 714/10 |
|---|---|---|---|
| 4,803,682 A | 2/1989 | Hara et al. | ................... 714/23 |
| 5,535,405 A | 7/1996 | Byers et al. | ................. 710/110 |
| 5,870,301 A * | 2/1999 | Yakushiji et al. | ............... 700/3 |
| 5,951,683 A * | 9/1999 | Yuuki et al. | ................... 713/1 |
| 6,073,249 A | 6/2000 | Watabe et al. | ................. 714/4 |
| 6,920,520 B2 * | 7/2005 | Chen et al. | ................. 710/306 |

FOREIGN PATENT DOCUMENTS

| JP | 58-146907 | 9/1983 |
|---|---|---|
| JP | H06-219310 | 8/1994 |
| JP | H07-293320 | 11/1995 |

OTHER PUBLICATIONS

European Search Report for corresponding European Patent Application Serial No. 03007913.1-1225 dated Aug. 16, 2007.

* cited by examiner

*Primary Examiner*—Eric Coleman
(74) *Attorney, Agent, or Firm*—Brinks Hofer Gilson & Lione

(57) ABSTRACT

A master CPU and a slave CPU for processing data supplied from a detector unit, and a timer cleared by a clear signal supplied every predetermined time period from the master CPU when the operation of the master CPU is normal and adapted for supplying a reset signal to the master CPU and the slave CPU after the lapse of the predetermined time period and further after the lapse of another predetermined time period when an anomaly occurs in the operation of the master CPU. The master CPU monitors the processing data outputted from the slave CPU, and supplies a forced reset signal to the slave CPU when anomaly in the operation of the slave CPU is detected.

1 Claim, 2 Drawing Sheets

CONTROLLER WITH FAIL-SAFE FUNCTION

BACKGROUND OF THE INVENTION

1. Field of the Invention

This invention relates to a controller with a fail-safe function, and particularly to a controller with a fail-safe function having plural (usually, two) central processing units (CPU) for one control object and adapted for temporarily stopping the operation of the controller when an anomaly occurs in the operation of one of the central processing units, thus preventing output of erroneous control data.

2. Description of the Related Art

Conventionally, a controller with a fail-safe function having two central processing units (CPU), that is, a master central processing unit (hereinafter referred to as master CPU) and a slave central processing unit (hereinafter referred to as slave CPU), is known.

In this case, in a first example of the known controller with a fail-safe function, the master CPU constantly monitors the operation of the slave CPU, and when anomaly occurs in the operation of the slave CPU, the master CPU supplies a reset signal to the slave CPU to reset the slave CPU and thus temporarily stops the operation of the slave CPU.

In a second example of the known controller with a fail-safe function, the same detection data is supplied to the master CPU and the slave CPU, and first intermediate processing data processed by the master CPU and second intermediate processing data corresponding thereto and processed by the slave CPU are compared with each other. When the first and second intermediate processing data are coincident with each other, a coincidence signal is outputted. When the first and second intermediate processing data are not coincident with each other, a non-coincidence signal is outputted.

In the first example of the known controller with a fail-safe function, when anomaly occurs in the operation of the slave CPU, abnormal processing data is prevented from being outputted from the slave CPU. However, since no measure is provided for monitoring abnormal operation of the master CPU or stopping the abnormal operation when anomaly occurs in the operation of the master CPU, output of unwanted processing data may be continued.

In the second example of the known controller with a fail-safe function, when first intermediate processing data processed by the master CPU and second intermediate processing data processed by the slave CPU are compared with each other, only a coincidence signal is outputted in the case the first and second intermediate processing data are coincident with each other, or only a non-coincidence signal is outputted in the case the first and second intermediate processing data are not coincident with each other. Since no measure is provided for stopping the operation when anomaly occurs in the detector unit for detecting coincidence or non-coincidence of the first and second processing data or when anomaly is detected in the signal output function itself, erroneous processing data may be outputted.

SUMMARY OF THE INVENTION

In view of the foregoing status of the art, it is an object of the present invention to provide a controller with a fail-safe function that enables self-repair when anomaly occurs in the operation of a master CPU and that securely prevents output of processing data when anomaly occurs in the processing data to be outputted.

In order to achieve the above-described object, a controller with a fail-safe function according to the present invention includes: a master CPU (master central processing unit) and a slave CPU (slave central processing unit) for processing data supplied from a detector unit and outputting the data; and a timer cleared by a clear signal supplied every predetermined time period from the master CPU when the operation of the master CPU is normal, and adapted for supplying a reset signal to the master CPU and the slave CPU after the lapse of the predetermined time period and further after the lapse of another predetermined time period when an anomaly occurs in the operation of the master CPU; the master CPU having first means for monitoring the data output by the slave CPU, and supplying a forced reset signal to the slave CPU to restore an initial operation of the slave CPU when anomaly in the operation of the slave CPU is detected.

With the first means, when an anomaly occurs in the operation of the master CPU, the timer is not cleared after the lapse of the predetermined time period. After the lapse of the predetermined time period and further after the lapse of another predetermined time period, count-up is performed and a reset signal is supplied to the master CPU and the slave CPU. This temporarily stops the operation of the master CPU and enables the master CPU to start its operation later in the normal operation state.

Moreover, in order to achieve the above-described object, a controller with a fail-safe function according to the present invention includes: a master CPU (master central processing unit) a detector unit, and a slave CPU (slave central processing unit) for processing data supplied from the detector unit and outputting first and second processing data; a communication line connected between the master CPU and the slave CPU; a bus line; a first repeater unit connected between the master CPU and the bus line; and a second repeater unit connected between the slave CPU and the bus line; the master CPU having second means for judging the operation state of the master CPU and the slave CPU using the first processing data and the second processing data acquired via the communication line, and when the slave CPU outputs the second processing data to the bus line via the second repeater unit, acquiring the second processing data from the bus line via the first repeater unit and monitoring the operation of the slave CPU using the acquired second processing data.

With the second means, the master CPU not only acquires, via the communication line, the second processing data outputted from the slave CPU via the communication line and judges the operation state of the master CPU and the slave CPU using its own first processing data and the acquired second processing data, but also acquires the second processing data via the second repeater unit, the bus line and the first repeater unit and monitors the operation of the slave CPU using the acquired second processing data. Therefore, an anomaly in the operation of the master CPU and the slave CPU can be quickly detected and dealt with appropriately. Moreover, when an anomaly occurs in operation of a comparator unit for the first processing data acquired from the master CPU and the second processing data acquired from the slave CPU, or when an anomaly occurs in the operation of the master CPU itself, output of the abnormal first processing data or the abnormal second processing data can be prevented.

In this case, it is preferred that when the first processing data is compared with the second processing data acquired from the slave CPU via the communication line and the first and second processing data are not coincident with each other as a result of the comparison, the master CPU having the second means temporarily stops the operation of the master CPU and the slave CPU and restores the initial operation of the master CPU and the slave CPU after the lapse of a predetermined time period. Moreover, it is preferred that when the first and second processing data are coincident with each other, the master CPU with the second means causes the slave CPU to send the second processing data to the bus line via the second repeater unit, acquires the second processing data sent to the bus line via the first repeater unit, compares the first processing data with the acquired second processing data, temporarily stops the operation of the slave CPU when the first and second processing data are not coincident with each other as a result of the comparison, and restores the initial operation of the slave CPU after the lapse of a predetermined time period.

With such a structure, an anomaly in the operation of the master CPU and the slave CPU can be quickly detected and dealt with appropriately by a relatively simple measure. Moreover, when an anomaly occurs in the operation of the comparator unit for the first processing data acquired from the master CPU and the second processing data acquired from the slave CPU, or when an anomaly occurs in the operation of the master CPU itself, output of the abnormal first processing data or the abnormal second processing data can be prevented quickly.

As described above, according to the first aspect of the invention, when an anomaly occurs in the operation of the master CPU, the timer is not cleared after the lapse of the predetermined time period. After the lapse of the predetermined time period and further after the lapse of another predetermined time period, count-up is performed and a reset signal is supplied to the master CPU and the slave CPU. Therefore, the operation of the master CPU is temporarily stopped and the operation of the master CPU can be started later in the normal operation state.

According to the second and third aspects of the invention, the master CPU not only acquires, via the communication line, the second processing data outputted from the slave CPU via the communication line and judges the operation state of the master CPU and the slave CPU using its own first processing data and the acquired second processing data, but also acquires the second processing data via the second repeater unit, the bus line and the first repeater unit and monitors the operation of the slave CPU using the acquired second processing data. Therefore, an anomaly in the operation of the master CPU and the slave CPU can be quickly detected and dealt with appropriately. Moreover, when an anomaly occurs in the operation of the comparator unit for the first processing data acquired from the master CPU and the second processing data acquired from the slave CPU, or when an anomaly occurs in the operation of the master CPU itself, output of the abnormal first processing data or the abnormal second processing data can be prevented.

DESCRIPTION OF THE PREFERRED EMBODIMENTS

An embodiment of the present invention will now be described with reference to the drawings.

Figure 1:
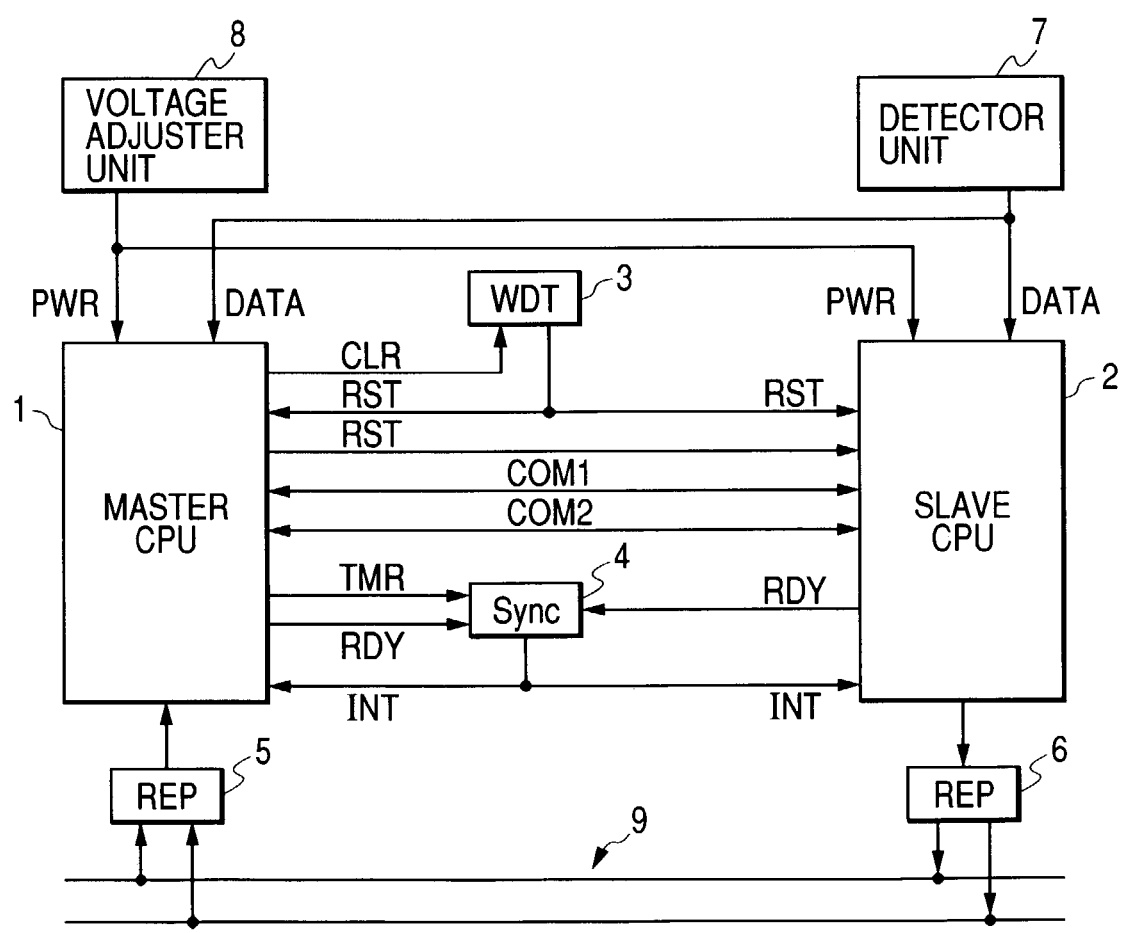
FIG. 1 is a block diagram illustrating a portion of a controller with a fail-safe function arranged according to the present invention.

FIG. 1 is a block diagram illustrating a portion of a controller with a fail-safe function according to the present invention. FIG. I shows a controller carried on an automobile.

As shown in FIG. 1, the controller with a fail-safe function according to this embodiment has a master CPU (master central processing unit) 1, a slave CPU (slave central processing unit) 2, a timer (WDT) 3, a synchronizing signal generator unit (Sync) 4, a first repeater (REP) 5, a second repeater (REP) 6, and two communication lines COM1, COM2.

Outside of this controller, a detector unit 7 for generating operation data showing the operation state of an operating switch, detection data showing the result of detection by various sensors and so on, a voltage adjuster unit 8 for adjusting the voltage of a vehicle power source (battery) and outputting the adjusted voltage, and a bus line 9 laid within the automobile.

The master CPU 1, the slave CPU 2, the timer 3, the synchronizing signal generator unit 4, the first repeater 5 and the second repeater 6 are interconnected by signal lines as shown in FIG. 1. The master CPU 1 and the slave CPU 2 are connected with each other by the communication lines COM1, COM2 as shown in FIG. 1. The master CPU 1 and the slave CPU 2, and the detector unit 7 and the voltage adjuster unit 8 are connected with each other by signal lines as shown in FIG. 1. The first repeater 5, the second repeater 6 and the bus line 9 are similarly connected with each other by signal lines as shown in FIG. 1.

In this case, of the signal lines shown in FIG. 1, CLR represents a clear signal line, RST represents a reset signal line, TMR represents a timer signal line, RDY represents a standby signal line, INT represents a synchronizing signal line, DATA represents a detection data supply line, and PWR represents an adjusted voltage supply line.

Figure 2:
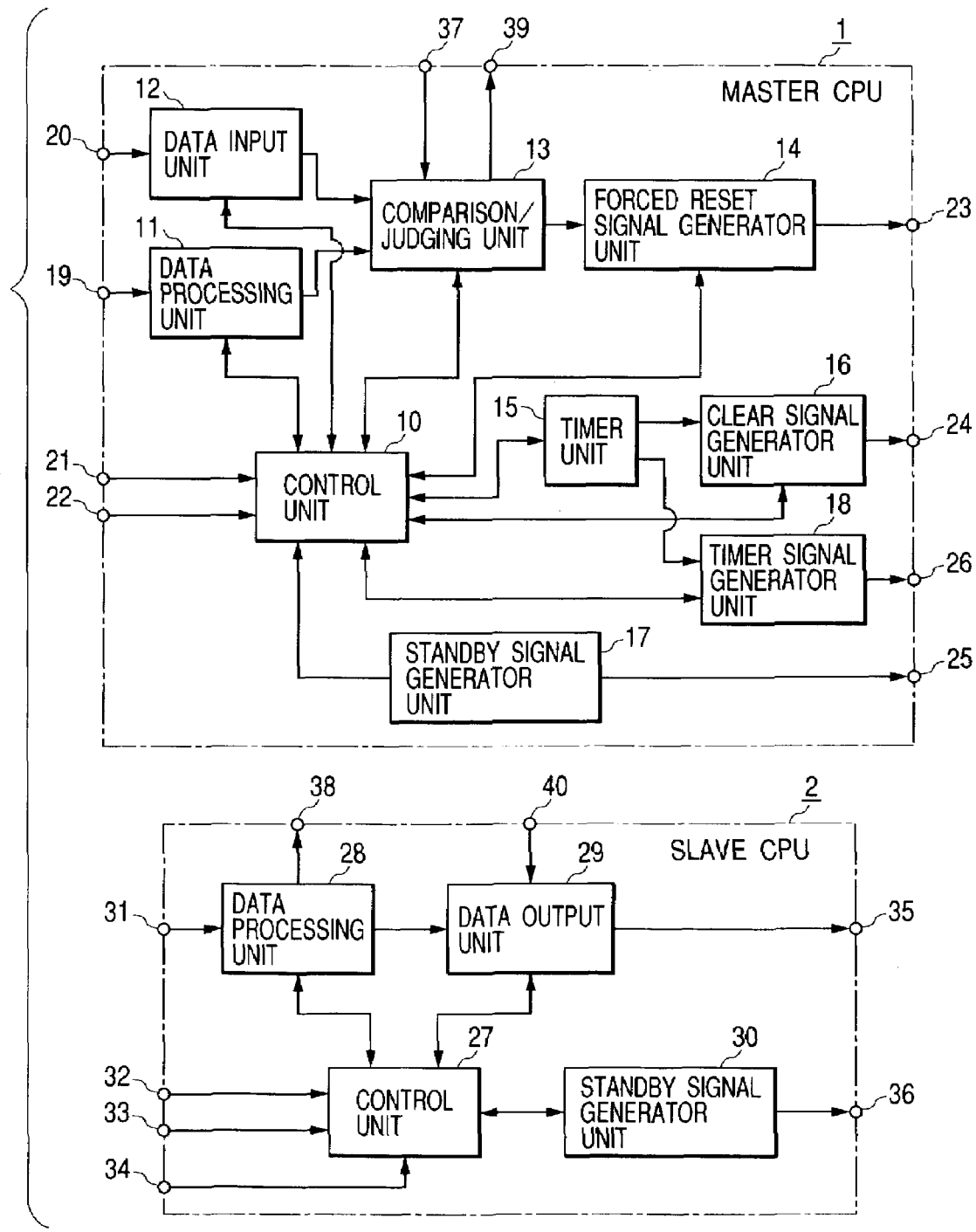
FIG. 2 is a block diagram illustrating an exemplary internal structure of a master CPU and a slave CPU shown in FIG. 1.

FIG. 2 is a block diagram illustrating an exemplary internal structure of the master CPU 1 and the slave CPU 2 shown in FIG. 1.

As illustrated in FIG. 2, the master CPU 1 has a control unit 10, a data processing unit 11, a data input unit 12, a comparison/judging unit 13, a forced reset signal generator unit 14, a timer unit 15, a clear signal generator unit 16, a standby signal generator unit 17, a timer signal generator unit 18, a detection data input terminal 19, a processing data input terminal 20, a reset signal input terminal 21, a synchronizing signal input terminal 22, a forced reset signal output terminal 23, a clear signal output terminal 24, a standby signal output terminal 25, a timer signal output terminal 26, a processing signal input terminal 37, and a judgment signal output terminal 39.

The slave CPU 2 has a control unit 27, a data processing unit 28, a data output unit 29, a standby signal generator unit 30, a detection data input terminal 31, a reset signal input terminal 32, a synchronizing signal input terminal 33, a forced reset signal input terminal 34, a processing data output terminal 35, a standby signal output terminal 36, a processing signal output terminal 38, and a judgment signal input terminal 40.

In the master CPU 1, the control unit 10 has its control ends connected with the control ends of the data processing unit 11, the data input unit 12, the comparison/judging unit 13, the forced reset signal generator unit 14, the timer unit 15, the clear signal generator unit 16, the standby signal generator unit 17 and the timer signal generator unit 18, and has its input ends connected with the reset signal input terminal 21 and the synchronizing signal input terminal 22. The data processing unit 11 has its input end connected with the detection data input terminal 19 and has its output end connected with a first input end of the comparison/judging unit 13. The data input unit 12 has its input end connected with the processing data input terminal 20 and has its output end connected with a second input end of the comparison/judging unit 13. The comparison/judging unit 13 has its output end connected with the input end of the forced reset signal generator unit 14 and also has its output end connected with the processing signal output terminal 38 of the slave CPU 2 via the processing signal input terminal 37 and the judgment signal output terminal 39. The forced reset signal generator unit 14 has its output end connected with the forced reset signal output terminal 23. The timer unit 15 has its output ends connected with the input ends of the clear signal generator unit 16 and the timer signal generator unit 18. The clear signal generator unit 16 has its output end connected with the clear signal output terminal 24. The timer signal generator unit 18 has its output end connected with the timer signal output terminal 26. The standby signal generator unit 17 has its output end connected with the standby signal output terminal 25.

In the slave CPU 2, the control unit 27 has its control ends connected with the control ends of the data processing unit 28, the data output unit 29 and the standby signal generator unit 30, and has its input ends connected with the reset signal input terminal 32, the synchronizing signal input terminal 33 and the forced reset signal input terminal 34. The data processing unit 28 has its input end connected with the detection data input terminal 31 and has its output end connected with the input end of the data output unit 29 and also has its output end connected with the processing signal output terminal 38. The data output unit 29 has its output end connected with the processing data output terminal 35 and also has its output end connected with the judgment signal input terminal 40. The standby signal generator unit 30 has its output end connected with the standby signal output terminal 36.

Moreover, though not shown in FIG. 2, the detection data input terminals 19 and 31 are connected with the detector unit 7 via the detection data supply lines DATA, respectively, and the processing data input terminal 20 is connected with the bus line 9 via the first repeater 5. The reset signal input terminals 21 and 32 are connected with the timer 3 via the reset signal lines RST, respectively, and the synchronizing signal input terminals 22 and 33 are connected with the synchronizing signal generator unit 4 via the synchronizing signal lines INT, respectively. The forced reset signal output terminal 23 and the forced reset signal input terminal 34 are connected with the reset signal lines RST, respectively, and the clear signal output terminal 24 is connected with the timer 3 via the clear signal line CLR. The standby signal output terminals 25 and 36 are connected with the synchronizing signal generator unit 4 via the standby signal lines RDY, respectively, and the timer signal output terminal 26 is connected with the synchronizing signal generator unit 4 via the timer signal line TMR. The processing data output terminal 35 is connected with the bus line 9 via the second repeater 6.

The processing signal input terminal 37 connected with the comparison/judging unit 13 on the side of the master CPU 1 and the processing signal output terminal 38 connected with the data processing unit 28 on the side of the slave CPU 2 are connected with the communication line COM1. The judgment signal output terminal 39 connected with the comparison/judging unit 13 and the judgment signal input terminal 40 connected with the data output unit 29 on the side of the slave CPU 2 are connected with the communication line COM2.

The controller with a fail-safe function according to this embodiment having the above-described structure operates as follows.

First, the case where the master CPU 1 and the slave CPU 2 normally operate will be described.

In the master CPU 1, when detection data detected by the detector unit 7 is supplied to the detection data input terminal 19 via the detection data supply line DATA, the data processing unit 11 processes the detection data in a predetermined mode to form processing data (hereinafter this processing data is referred to as first processing data) and supplies the first processing data to the first input end of the comparison/judging unit 13.

Similarly, in the slave CPU 2, when detection data detected by the detector unit 7 is supplied to the detection data input terminal 31 via the detection data supply line DATA, the data processing unit 28 processes the detection data in the above-described predetermined mode to form processing data (hereinafter this processing data is referred to as second processing data) and supplies the second processing data to the data output unit 29 and also supplies the second processing data from the processing signal input terminal 37 to the comparison/judging unit 13 via communication line COM1 and the processing signal output terminal 38 on the side of the master CPU 1. The comparison/judging unit 13 compares the first processing data supplied from the data processing unit 11 with the second processing data supplied from the slave CPU 2 and judges whether these processing data are coincident with each other or not. When these processing data are coincident with each other, a judgment signal indicating the coincidence is supplied from the judgment signal output terminal 39 to the data output unit 29 via the communication line COM2 and the judgment signal input terminal 40 on the side of the slave CPU 2. Having received the coincidence judgment signal, the data output unit 29 supplies the second processing data to the second repeater 6 via the processing data output terminal 35 and sends the second processing data from the second repeater 6 to the bus line 9.

At this point, the master CPU 1 receives the second processing data sent to the bus line 9, by the first repeater 5, and supplies the received second processing data to the data input unit 12 via the processing data input terminal 20. The data input unit 12 transmits the supplied second processing data to the second input end of the comparison/judging unit 13. The comparison/judging unit 13 compares the first processing data supplied to the first input end with the second processing data supplied to the second input end and judges whether these processing data are coincident with each other or not. In this case, since both the master CPU 1 and the slave CPU 2 operate normally and the whole output system including the output circuit is normal, the first processing data and the second processing data supplied to the second input end are almost the same. The comparison/judging unit 13 judges that these processing data are coincident with each other, and does not supply an output command signal to the forced reset signal generator unit 14.

In the master CPU 1, the timer unit 15 performs a timer operation under the control of the control unit 10 in parallel with the above-described operation, and supplies an output command signal to the clear signal generator unit 16 after performing the timer operation for a predetermined time period. The clear signal generator unit 16 generates a clear signal in response to the supplied output command signal and supplies the generated clear signal to the clear signal output terminal 24. After supplying the output command signal to the clear signal generator unit 16, the timer unit 15 has its timer value reset to its initial value and starts the timer operation again. This clear signal is supplied from the clear signal output terminal 24 to the timer 3 via the clear signal line CLR and restores the initial value of the timer value of the timer 3.

In this case, the time-up value of the timer 3 is set to be longer than the arrival time interval between the continuously supplied two clear signals, that is, the above-described predetermined time period. More specifically, it is set to be equal to the above-described predetermined time period plus another predetermined time period. Therefore, the time-up value is not reached while the clear signal is supplied at an interval of the above-described predetermined time period. Therefore, the timer 3 does not output the reset signal to the reset signal line RST and the master CPU 1 and the slave CPU 2 are not set by the reset signal to the initial operation.

Moreover, the master CPU 1 has the standby signal generator unit 17 and the timer signal generator unit 18 for temporary stop of the operation of the master CPU and the slave CPU 2 and subsequent resumption of the operation.

When the master CPU 1 is in the state of temporarily stopping the operation of the master CPU 1 and the slave CPU 2, the master CPU 1 supplies an output command signal to the standby signal generator unit 17 under the control of the control unit 10. The standby signal generator unit 17 generates a standby signal in response to the supplied output command signal and supplies the generated standby signal to the standby signal output terminal 25. This standby signal is supplied from the standby signal output terminal 25 to the synchronizing signal generator unit 4 via the standby signal line RDY. Having received the standby signal, the synchronizing signal generator unit 4 stops generating a synchronizing signal. As the generation of a synchronizing signal by the synchronizing signal generator unit 4 is stopped, no synchronizing signal is supplied to the master CPU 1 and the slave CPU 2 via the synchronizing signal line INT and the operation of the master CPU 1 and the slave CPU 2 is temporarily stopped.

When the master CPU 1 is in the state of resuming the operation of the master CPU 1 and the slave CPU 2, the master CPU 1 supplies an output command signal from the timer unit 15 to the timer signal generator unit 18 under the control of the control unit 10. Having received the output command signal, the timer signal generator unit 18 generates a timer signal and supplies the generated timer signal to the timer signal output terminal 26. This timer signal is supplied from the timer signal output terminal 26 to the synchronizing signal generator unit 4 via the timer signal line TMR. Having received the timer signal, the synchronizing signal generator unit 4 resumes generation of a synchronizing signal. Thus, the synchronizing signal is supplied to the master CPU 1 and the slave CPU 2 via the synchronizing signal line INT, and the operation of the master CPU 1 and the slave CPU 2 is resumed.

The temporary stop of the operation of the master CPU 1 and the slave CPU 2 carried out by the synchronizing signal generator unit 4 can also be carried out by supplying a standby signal generated by the standby signal generator unit 30 on the side of the slave CPU 2 from the standby signal output terminal 36 to the synchronizing signal generator unit 4 via the standby signal line RDY.

Next, the case where the master CPU 1 normally operates while anomaly occurs in the operation of the slave CPU 2 will be described.

Also in this case, in the master CPU 1, when detection data detected by the detector unit 7 is supplied to the detection data input terminal 19 via the detection data supply line DATA, the data processing unit 11 processes the detection data in a predetermined mode to form first processing data and supplies this first processing data to the first input end of the comparison/judging unit 13.

Similarly, in the slave CPU 2, when detection data detected by the detector unit 7 is supplied to the detection data input terminal 31 via the detection data supply line DATA, the data processing unit 28 processes the detection data in the predetermined mode to form second processing data and supplies the second processing data to the data output unit 29.

In this case, if the operation of the data processing unit 28 of the slave CPU 2 is abnormal, the comparison/judging unit 13 judges that the first processing data and the second processing data supplied thereto are not coincident with each other, and supplies an output command signal to the forced reset signal generator unit 14. The forced reset signal generator unit 14 generates a forced reset signal in response to this output command signal.

The generated forced reset signal is supplied to the forced reset signal input terminal 34 on the side of the slave CPU 2 via the reset signal line RST and then supplied to the control unit 27. In the slave CPU 2, as the forced reset signal is supplied to the control unit 27, the control unit 27 is reset by the forced reset signal and returns to its initial operation. Then, after the lapse of a predetermined time period, the control unit 27 starts operating normally.

Meanwhile, during the period from the reset of the control unit 27 due to the supply of the forced reset signal until the control unit 27 starts operating normally, the data processing unit 28 stops processing the detection data. Therefore, the second processing data processed by the data processing unit 28 during the abnormal operation is not transmitted from the data output unit 29 to the bus line 9 via the second repeater 6, and malfunction of the controlled mechanism due to the supply of the abnormal second processing data can be avoided.

On the other hand, when the data processing unit 28 of the slave CPU 2 operates normally and anomaly occurs in the operation of the output system including the data output unit 29, the second processing data supplied from the data processing unit 28 to the comparison/judging unit 13 of the master CPU 1 via the communication line COM1 and the processing signal input terminal 37 on the side of the master CPU 1 has not anomaly. Therefore, the comparison/judging unit 13 supplies a judgment signal indicating that the first processing data and the second processing data are coincident with each other, from the judgment signal output terminal 39 to the data output unit 29 via the communication line COM2 and the judgment signal input terminal 40.

The data output unit 29 supplies the supplied second processing data to the second repeater 6 via the processing data output terminal 35 to send the second processing data from the second repeater 6 to the bus line 9.

Also at this point, in the master CPU 1, the first repeater 5 receives the second processing data sent to the bus line 9, and when the second processing data received by the first repeater 5 is supplied to the processing data input terminal 20, the data input unit 12 supplies this second processing data to the second input end of the comparison/judging unit 13. The comparison/judging unit 13 compares the first processing data supplied to its first input end with the second processing data supplied to its second input end. In this case, since the operation of the master CPU 1 is normal but the operation of the output system including the data output unit 29 of the slave CPU 2 is abnormal, the first processing data and the second processing data are not coincident with each other. The comparison/judging unit 13 judges that these processing data are not coincident, and supplies an output command signal to the forced reset signal generator unit 14. The forced reset signal generator unit 14 generates a forced reset signal in response to the supplied output command signal and supplies the generated forced reset signal to the forced reset signal output terminal 23.

This forced reset signal is supplied to the forced reset signal input terminal 34 on the side of the slave CPU 2 via the reset signal line RST and then supplied to the control unit 27. The control unit 27 is reset by the supply of the forced reset signal and returns to its initial operation. Then, after the lapse of a predetermined time period from the return to the initial operation, the control unit 27 starts operating normally. Also in this case, during the period from the reset of the control unit 27 due to the supply of the forced reset signal until the control unit 27 starts operating normally, the data processing unit 28 stops processing the detection data. Therefore, the second processing data processed by the data processing unit 28 during the abnormal operation is not transmitted from the data output unit 29 to the bus line 9 via the second repeater 6, and malfunction of the controlled mechanism due to the supply of the abnormal second processing data can be avoided.

Next, the case where the slave CPU 2 operates normally and anomaly occurs in the operation of the master CPU 1 will be described.

Originally, in the master CPU 1, the timer unit 15 is to perform the timer operation under the control of the control unit 10, and after performing the timer operation for a predetermined time, the timer unit 15 is to supply an output command signal to the clear signal generator unit 16. However, when anomaly occurs in the operation of the control unit 10, the timer operation of the timer unit 15 is not performed normally and an output command signal is not supplied to the clear signal generator 16 even after the lapse of the predetermined time. Since no output command signal is supplied to the clear signal generator 16, the clear signal generator 16 does not generate a clear signal and no clear signal is supplied to the timer 3 via the clear signal line CLR.

In this case, after the lapse of the predetermined time period from the previous supply of a clear signal and even after the lapse of another predetermined time period, the next clear signal is not supplied to the timer 3. Therefore, the timer 3 enters the time-up state and generates a reset signal at that time. This reset signal is supplied to the reset signal input terminal 21 on the side of the master CPU 1 and the reset signal input terminal 32 on the side of the slave CPU 2 via the reset signal line RST, and the control unit 10 of the master CPU 1 and the control unit 27 of the slave CPU 2 are reset by this reset signal. This restores the initial operation of the control unit 10 and the control unit 27, and after the lapse of a predetermined time period from the restoration of the initial operation, the control unit 10 and the control unit 27 start operating normally. Also in this case, during the period from the supply of the reset signal to the control unit 27 to restore the initial operation until the control unit 27 starts operating normally, the data processing unit 28 stops processing the detection data. Therefore, the second processing data processed by the data processing unit 28 during the abnormal operation is not transmitted from the data output unit 29 to the bus line 9 via the second repeater 6, and malfunction of the controlled mechanism can be avoided.

Meanwhile, in the controller with a fail-safe function according to this embodiment, it is preferred that the same time interval as the time interval of sending data to the bus line 9, for example, a time period of approximately 10 microseconds is selected as the predetermined time period representing the interval of supply of a clear signal for clearing the timer 3, and that a time period that is longer than the time interval of the clear signal to the timer 3 and shorter than twice the time interval of the clear signal, for example, a time period of approximately 15 microseconds is selected as the predetermined time period from the interruption of supply of the clear signal to the timer 3 until the count-up operation.

The controller with a fail-safe function according to this embodiment is described above using an example in which it is carried on an automobile. However, the controller with a fail-safe function according to the present invention is not limited to the case of being carried on an automobile and can be applied to the case of being carried on other vehicles similar to an automobile.

What is claimed is:

1. A controller with a fail-safe function comprising:
a master central processing unit;
a detector unit;
a slave central processing unit for processing data supplied from the detector unit and outputting first and second processing data;
a communication line connected between the master central processing unit and the slave central processing unit;
a bus line;
a first repeater unit connected between the master central processing unit and the bus line; and
a second repeater unit connected between the slave central processing unit and the bus line,
wherein the master central processing unit judges the operation state of the master central processing unit and the slave central processing unit using the first processing data and the second processing data, and when the slave central processing unit outputs the second processing data to the bus line via the second repeater unit, the master central processing unit acquires the second processing data from the bus line via the first repeater unit and monitors the operation of the slave central processing unit using the acquired second processing data;
wherein the master central processing unit compares the first processing data with the second processing data, and where the first and second processing data are not coincident with each other, the master central processing unit temporarily stops the operation of the master central processing unit and the slave central processing unit and restores an initial operation of the master central processing unit and the slave central processing unit after the lapse of a predetermined time period, and where the first and second processing data are coincident with each other, the master central processing unit causes the slave central processing unit to send the second processing data to the bus line via the second repeater unit, acquires the second processing data sent to the bus line via the first repeater unit, compares the first processing data with the acquired second processing data, temporarily stops the operation of the slave central processing unit when the first and second processing data are not coincident with each other, and restores the initial operation of the slave central processing unit after the lapse of a predetermined time period.

* * * * *